United States Patent
Yoshida et al.

(10) Patent No.: US 11,767,404 B2
(45) Date of Patent: Sep. 26, 2023

(54) RESIN COMPOSITION FOR MASTERBATCH

(71) Applicant: MITSUI CHEMICALS, INC., Tokyo (JP)

(72) Inventors: Yuto Yoshida, Chiba (JP); Shota Abe, Chiba (JP); Atsushi Takeshima, Ichihara (JP); Terufumi Suzuki, Ichihara (JP); Kouzi Matsunaga, Yokohama (JP)

(73) Assignee: MITSUI CHEMICALS, INC., Tokyo (JP)

( * ) Notice: Subject to any disclaimer, the term of this patent is extended or adjusted under 35 U.S.C. 154(b) by 578 days.

(21) Appl. No.: 16/962,898

(22) PCT Filed: Mar. 7, 2019

(86) PCT No.: PCT/JP2019/009010
§ 371 (c)(1),
(2) Date: Jul. 17, 2020

(87) PCT Pub. No.: WO2019/172355
PCT Pub. Date: Sep. 12, 2019

(65) Prior Publication Data
US 2021/0002435 A1 Jan. 7, 2021

(30) Foreign Application Priority Data
Mar. 7, 2018 (JP) .................. 2018-040828

(51) Int. Cl.
| | | |
|---|---|---|
| C08J 3/22 | (2006.01) |
| C08F 236/06 | (2006.01) |
| C08L 23/08 | (2006.01) |
| C08L 23/12 | (2006.01) |
| C08L 23/14 | (2006.01) |
| C08L 53/02 | (2006.01) |
| C08F 8/04 | (2006.01) |
| C08F 212/08 | (2006.01) |
| C08J 3/12 | (2006.01) |
| C08L 101/00 | (2006.01) |
| C08L 69/00 | (2006.01) |
| C08L 55/02 | (2006.01) |
| C08L 67/00 | (2006.01) |
| C08L 77/00 | (2006.01) |
| C08L 79/00 | (2006.01) |
| C08L 59/00 | (2006.01) |

(52) U.S. Cl.
CPC .................. *C08J 3/22* (2013.01); *C08F 8/04* (2013.01); *C08F 212/08* (2013.01); *C08F 236/06* (2013.01); *C08J 3/12* (2013.01); *C08L 23/08* (2013.01); *C08L 23/0815* (2013.01); *C08L 23/12* (2013.01); *C08L 23/14* (2013.01); *C08L 53/02* (2013.01); *C08L 101/00* (2013.01); *C08L 55/02* (2013.01); *C08L 59/00* (2013.01); *C08L 67/00* (2013.01); *C08L 69/00* (2013.01); *C08L 77/00* (2013.01); *C08L 79/00* (2013.01); *C08L 2203/30* (2013.01); *C08L 2205/04* (2013.01)

(58) Field of Classification Search
CPC .... C08L 53/02; C08L 53/025; C08L 23/0815; C08L 23/10; C08L 23/12; C08L 55/02; C08L 59/00; C08L 59/02; C08L 59/04; C08L 67/00; C08L 67/02; C08L 67/025; C08L 67/03; C08L 67/04; C08L 67/06; C08L 67/07; C08L 67/08; C08L 69/00; C08L 69/005; C08L 77/00; C08L 77/02; C08L 77/04; C08L 77/06; C08L 77/08; C08L 77/10; C08L 77/12; C08L 79/08
See application file for complete search history.

(56) References Cited

U.S. PATENT DOCUMENTS

| | | |
|---|---|---|
| 4,668,834 A | 5/1987 | Rim et al. |
| 4,704,491 A | 11/1987 | Tsutsui et al. |
| 4,908,411 A | 3/1990 | Kinoshita et al. |
| 5,093,418 A | 3/1992 | Kinoshita et al. |

(Continued)

FOREIGN PATENT DOCUMENTS

| | | |
|---|---|---|
| EP | 1 130 055 A1 | 9/2001 |
| JP | S61-126120 A | 6/1986 |

(Continued)

OTHER PUBLICATIONS

Translation of WO2015098832A1 from IP.com (Year: 2015).*

(Continued)

*Primary Examiner* — Kregg T Brooks
*Assistant Examiner* — David R. Foss
(74) *Attorney, Agent, or Firm* — Foley & Lardner LLP

(57) ABSTRACT

A masterbatch of a liquid additive is provided, the resin composition for the masterbatch comprising (a) a block copolymer or a hydrogenated product thereof, the block copolymer containing a polymer block having a vinyl aromatic compound as a main component and a polymer block having a conjugated diene compound as a main component, and 40 to 100 parts by mass of a polyolefinic resin and 100 to 150 parts by mass of an ethylene·α-olefin copolymer with respect to 100 parts by mass of the (a) component, wherein the kinematic viscosity at 100° C. is 10 to 5,000 mm$^2$/s; the ethylene molar content is in the range of 30 to 85 mol %; and the molecular weight distribution (Mw/Mn) for the molecular weight measured by gel permeation chromatography (GPC) with reference to polystyrene is not more than 2.5.

8 Claims, No Drawings

(56) References Cited

U.S. PATENT DOCUMENTS

| | | | |
|---|---|---|---|
| 5,767,331 A | 6/1998 | Oda et al. | |
| 5,955,639 A | 9/1999 | Oda et al. | |
| 6,153,807 A | 11/2000 | Oda et al. | |
| 6,221,961 B1 | 4/2001 | Hirano et al. | |
| 6,759,465 B1 | 7/2004 | Shimojo et al. | |
| 7,790,661 B2 | 9/2010 | Covitch et al. | |
| 7,960,320 B2 | 6/2011 | Covitch et al. | |
| 8,268,929 B2 | 9/2012 | Ono | |
| 10,040,884 B2 | 8/2018 | Harada et al. | |
| 10,329,366 B2 | 6/2019 | Harada et al. | |
| 2005/0199859 A1* | 9/2005 | Terada | C08L 71/123 252/500 |
| 2006/0025316 A1 | 2/2006 | Covitch et al. | |
| 2007/0203295 A1 | 8/2007 | Ono | |
| 2009/0082512 A1* | 3/2009 | Koyashiki | B60K 15/03177 524/442 |
| 2010/0311624 A1 | 12/2010 | Covitch et al. | |
| 2016/0215116 A1* | 7/2016 | Kani | C08K 3/105 |
| 2017/0114166 A1 | 4/2017 | Harada et al. | |
| 2018/0273662 A1 | 9/2018 | Harada et al. | |

FOREIGN PATENT DOCUMENTS

| | | |
|---|---|---|
| JP | S61-221207 A | 10/1986 |
| JP | H21163 B2 | 1/1990 |
| JP | H27998 B2 | 2/1990 |
| JP | H07-121969 B2 | 12/1995 |
| JP | 2593264 B2 | 3/1997 |
| JP | 2796376 B2 | 9/1998 |
| JP | H115912 A | 1/1999 |
| JP | 2909228 B2 | 6/1999 |
| JP | 2002-088238 A | 3/2002 |
| JP | 2007-099820 A | 4/2007 |
| JP | 2008-508402 A | 3/2008 |
| JP | 2010-053229 A | 3/2010 |
| JP | 2010-229424 A | 10/2010 |
| JP | 2015-160886 A | 9/2015 |
| JP | 2015-147215 S | 10/2015 |
| JP | 2016-017162 A | 2/2016 |
| JP | 2016-087110 A | 5/2016 |
| WO | WO-2015098832 A1 * | 7/2015 ............ C08F 255/04 |

OTHER PUBLICATIONS

International Searching Authority, "International Search Report," issued in connection with International Patent Application No. PCT/JP2019/009010, dated Jun. 11, 2019.

International Searching Authority, "Written Opinion," issued in connection with International Patent Application No. PCT/JP2019/009010, dated Jun. 11, 2019.

Bonda, et al., "Influence of compatibilizer on mechanical, morphological and rheological properties of PP/ABS blends", Iranian Polymer Journal, 2014, 23, pp. 415-425.

Lee, et al., "Effects of PP-g-MAH on the mechanical, morphological and rheological properties of polypropylene and poly(acrylonitrile-butadiene-styrene) blends", Macromolecular Research, 2009, vol. 17, No. 6, pp. 417-423.

* cited by examiner

RESIN COMPOSITION FOR MASTERBATCH

RELATED APPLICATIONS

The present application claims priority under 37 U.S.C. § 371 to International Patent Application No. PCT/JP2019/009010, filed Mar. 7, 2019, which claims priority to and the benefit of Japanese Patent Application No. 2018-040828, filed on Mar. 7, 2018. The contents of these applications are hereby incorporated by reference in their entireties.

TECHNICAL FIELD

The present invention relates to a resin composition for a masterbatch to be used for an engineering plastic especially excellent in the balance of moldability, mechanical property, slidability and wear resistance, and a molded article obtained from the resin composition.

BACKGROUND ART

Engineering plastics such as polyacetal, polyamide, polycarbonate, modified polyphenylene oxide, polyimide and polyester, since being high in melting point and moreover excellent in mechanical property, are broadly used in various types of industrial fields such as automobile industry fields and electric industry fields. Among the engineering plastics, however, there are many resins inferior in releasability from molds used in molding; particularly in the case of producing thin-wall molded articles and molded articles having complex shapes by using such resins, there arise such problems that the molded articles, when being taken out from the molds, are liable to be broken and poor appearance is caused.

Further among the engineering plastics, there are resins which are low in flowability and cannot be supplied smoothly from hoppers of molding machines used in injection molding or extrusion into the molding machines. Therefore, compositions of such resins, since being liable to become unstable in measurement accuracy, have such problematic points that the quality of various types of molded articles obtained by a molding process such as injection molding is liable to become unstable.

In order to solve the above-mentioned problematic points, there are conventionally adopted methods of adding various types of release agents and lubricants to resins. As the release agents or lubricants, there are conventionally used inorganic substances such as metal stearate salts and talc, soy bean lecithin, natural waxes, and synthetic waxes.

Then, required properties in the above-mentioned fields are gradually being enhanced; and as an example thereof, further improvement of sliding properties together with general physical properties is demanded. The sliding properties refer to friction/wear properties between a resin and a metal or between a resin and a resin.

The sliding properties can be improved by blending engineering plastics with fluororesins or polyolefinic resins, or additives for lubricant oils, such as fatty acids, fatty acid esters, silicone oils or various types of mineral oils. It is known that particularly resin compositions blended with liquid additives concurrently have excellent slidability and wear resistance low in friction coefficient.

For example, Patent Literature 1 discloses, with the aim of providing a resin composition excellent in molding processability and giving an engineering plastic molded article low in mold shrinkage coefficient, the resin composition constituted of a specific resin and a specific liquid ethylene·α-olefin random copolymer. Then Patent Literature 2 discloses, with the aim of providing a molding resin composition low in the friction coefficient and excellent in slidability, excellent in wear resistance, moreover good in flowability and mold releasability, and excellent in molding processability including no resin staining of molds, the resin composition constituted of a specific resin and an oxidatively modified substance of a specific liquid ethylene·α-olefin random copolymer.

For obtaining compositions composed of a resin being solid and a liquid, however, although melt kneading using an extruding machine is common, since the melt viscosity of the resin and the viscosity of the liquid are remarkably separated, it is difficult to homogeneously mix the liquid additive in the resin.

In such a case, the resin compositions in which the liquid additive is homogeneously dispersed can be obtained usually by previously obtaining a masterbatch containing the liquid additive in a high concentration, and then adding and blending the masterbatch in the resin.

In conventional masterbatches, however, in the case where a liquid additive is added in a high concentration, there are caused cutting failure of melt strands, tackiness due to bleedout thereof to the masterbatch surface, and inhomogeneous mixing thereof, thus making the handleability difficult. By contrast, when the concentration of the liquid additive is lowered to a level of not causing such problems, the amount of the masterbatch added to a final resin composition increases relatively and there arises such a problem that the mechanical strength of the final resin composition decreases due to thermal deterioration of a resin to become a base material of the masterbatch.

Depending on a resin to become a base material of the masterbatch, there arises such a risk that in a final resin composition, the liquid additive is incorporated in the masterbatch base material, impairing excellent slidability and wear resistance.

Further, when an engineering plastic blended with a liquid additive is used in a high-temperature environment, there arises such a problem that the liquid additive bleeds out to the surface of a molded article, impairing the appearance.

CITATION LIST

Patent Literature

Patent Literature 1: Japanese Patent No. 2909228
Patent Literature 2: Japanese Patent Laid-Open No. 11-5912

SUMMARY OF INVENTION

Technical Problem

The present invention is to solve the above-mentioned problematic points conventional masterbatches of liquid additives have.

That is, an object of the present invention is to provide a masterbatch of a liquid additive, the masterbatch being capable of containing the liquid additive in a high concentration, exhibiting little tackiness and being excellent in handleability. Further an object of the present invention is to provide a resin composition and a molded article having excellent slidability and wear resistance without impairing conventional appearance, mechanical property and moldability engineering plastics have.

Solution to Problem

As a result of exhaustive studies, the present inventors have found that the above problems can be solved by using a resin composition comprising a specific block copolymer or the like, a specific resin and a specific ethylene·α-olefin copolymer in specific ratios, and this finding has led to the completion of the present invention. The present invention specifically includes the following aspects.

[1] A resin composition for a masterbatch, comprising (a) a block copolymer or a hydrogenated product thereof, the block copolymer containing a polymer block having a structural unit derived from a vinyl aromatic compound as a main component and a polymer block having a structural unit derived from a conjugated diene compound as a main component, and 40 to 100 parts by mass of (b) a polyolefinic resin and 100 to 150 parts by mass of (c) an ethylene·α-olefin copolymer having characteristics (c1) to (c3) described below with respect to 100 parts by mass of the (a) component.

(c1) The kinematic viscosity at 100° C. is 10 to 5,000 mm$^2$/s.

(c2) The content of a structural unit derived from ethylene is in the range of 30 to 85 mol %.

(c3) The molecular weight distribution (Mw/Mn) for the molecular weight measured by gel permeation chromatography (GPC) with reference to polystyrene is not more than 2.5.

[2] The resin composition for a masterbatch according to [1], wherein the (a) component is a hydrogenated product of the block copolymer.

[3] The resin composition for a masterbatch according to [1] or [2], wherein the kinematic viscosity of the (c) ethylene·α-olefin copolymer at 100° C. is 500 to 3,000 mm$^2$/s.

[4] The resin composition for a masterbatch according to any one of [1] to [3], wherein the α-olefin of the (c) ethylene·α-olefin copolymer is propylene.

[5] The resin composition for a masterbatch according to any one of [1] to [4], wherein the (b) polyolefinic resin is polypropylene.

[6] The resin composition for a masterbatch according to any one of [1] to [5], wherein the conjugated diene compound is butadiene.

[7] A pellet, comprising the resin composition for a masterbatch according to any one of [1] to [6], and having an average particle diameter of larger than 1 mm and not larger than 6 mm.

[8] A molded article, comprising any one resin of polyacetal resins, ABS resins, polyamide resins, thermoplastic polyester resins, polyimide resins and polycarbonate resins, and 0.5 to 10 parts by mass of the resin composition for a masterbatch according to any one of [1] to [6] with respect to 100 parts by mass of the resin.

[9] A resin composition, comprising any one resin of polyacetal resins, ABS resins, polyamide resins, thermoplastic polyester resins, polyimide resins and polycarbonate resins, and 0.2 to 3 parts by mass of (a) a block copolymer or a hydrogenated product thereof, the block copolymer containing a polymer block having a structural unit derived from a vinyl aromatic compound as a main component and a polymer block having a structural unit derived from a conjugated diene compound as a main component, 0.08 to 3 parts by mass of (b) a polyolefinic resin, and 0.2 to 4.5 parts by mass of (c) an ethylene·α-olefin copolymer having characteristics (c1) to (c3) described above, with respect to 100 parts by mass of the resin, wherein the content of the (b) component is 40 to 100 parts by mass and the content of the (c) component is 100 to 150 parts by mass with respect to 100 parts by mass of the (a) component.

[10] A molded article comprising the resin composition according to [9].

Advantageous Effects of Invention

According to the present invention, there can be provided a masterbatch of a liquid additive, the masterbatch being capable of containing the liquid additive in a high concentration, exhibiting little tackiness and being excellent in handleability. There can further be provided a resin composition and a molded article having excellent slidability and wear resistance without impairing conventional mechanical property and moldability engineering plastics have.

DESCRIPTION OF EMBODIMENTS

Hereinafter, the present invention will be described in detail.

<A Resin Composition for a Masterbatch>

A resin composition for a masterbatch of the present invention comprises (a) a block copolymer or a hydrogenated product thereof, the block copolymer containing a polymer block having a structural unit derived from a vinyl aromatic compound as a main component and a polymer block having a structural unit derived from a conjugated diene compound as a main component, (b) a polyolefinic resin, and (c) an ethylene·α-olefin copolymer.

The resin composition for a masterbatch is constituted of the (a) block copolymer or a hydrogenated product thereof, the block copolymer containing a polymer block having a structural unit derived from a vinyl aromatic compound as a main component and a polymer block having a structural unit derived from a conjugated diene compound as a main component, and 40 to 100 parts by mass of the (b) polyolefinic resin and 100 to 150 parts by mass of the (c) ethylene·α-olefin copolymer with respect to 100 parts by mass of the (a) component.

The content of the (b) polyolefinic resin in the resin composition for a masterbatch is 40 to 100 parts by mass with respect to 100 parts by mass of the (a) component. When the content of the (b) polyolefinic resin with respect to 100 parts by mass of the (a) component is lower than 40 parts by mass, cutting failure of melt strands are caused in fabrication of the masterbatch, making it unable for a good masterbatch to be obtained. When exceeding 100 parts by mass, there are caused tackiness and inhomogeneous mixing due to bleedout of the (c) ethylene·α-olefin copolymer to the masterbatch surface. The content of the (b) polyolefinic resin with respect to 100 parts by mass of the (a) component is preferably 40 to 80 parts by mass and more preferably 40 to 70 parts by mass.

The content of the (c) ethylene·α-olefin copolymer is 100 to 150 parts by mass with respect to 100 parts by mass of the (a) component. When the content of the (c) ethylene·α-olefin copolymer with respect to 100 parts by mass of the (a) component is lower than 100 parts by mass, the amount of the masterbatch blended in an engineering plastic molded article increases and the mechanical property of the molded article reduces. When the content of the (c) ethylene·α-olefin copolymer with respect to 100 parts by mass of the (a) component exceeds 150 parts by mass, there are caused tackiness and inhomogeneous mixing due to bleedout of the (c) ethylene·α-olefin copolymer to the masterbatch surface. The content of the (c) ethylene·α-olefin copolymer with respect to 100 parts by mass of the (a) component is preferably 100 to 144 parts by mass and more preferably 100 to 140 parts by mass.

<The (a) Block Copolymer Containing a Polymer Block Having a Structural Unit Derived from a Vinyl Aromatic Compound as a Main Component and a Polymer Block Having a Structural Unit Derived from a Conjugated Diene Compound as a Main Component, or the Hydrogenated Product Thereof>

In the block copolymer or the hydrogenated product thereof being the (a) component of the resin composition for a masterbatch according to the present invention, the block copolymer has a polymer block (hereinafter, referred to also as "polymer block (A)") having a structural unit derived from a vinyl aromatic compound as a main component and a polymer block (hereinafter, referred to as "polymer block (B)") having a structural unit derived from a conjugated diene compound as a main component, and is hereinafter referred to also as "(A)/(B) block copolymer".

Specific examples of the vinyl aromatic compound constituting the polymer block (A) include styrene, α-methylstyrene, 1-vinylnaphthalene, 2-vinylnaphthalene, 3-methylstyrene, 4-propylstyrene, 4-cyclohexylstyrene, 4-dodecylstyrene, 2-ethyl-4-benzylstyrene, 4-(phenylbutyl) styrene, monochlorostyrene, dichlorostyrene, methoxystyrene, indene and acenaphthylene. One or two or more of these vinyl aromatic compounds can be used. Among these, styrene is most preferable.

As the conjugated diene compound constituting the polymer block (B), conjugated dienes having 4 to 20 carbon atoms are preferable; specific examples thereof include butadiene, isoprene and hexadiene; and one or two or more of these conjugated diene compounds can be used. Among these, butadiene and isoprene are more preferable, and in order to make the (c) ethylene·α-olefin copolymer to be described later to be contained in a high concentration, butadiene is especially preferable.

Further the weight-average molecular weight (Mw) with reference to polystyrene as measured by GPC of the (A)/(B) block copolymer containing the polymer block (A) and the polymer block (B) is preferably 30,000 to 500,000 and more preferably 50,000 to 300,000. When the weight-average molecular weight of the (A)/(B) block copolymer is not less than 30,000, the mechanical property of molded articles obtained from the polymer composition is improved; on the other hand, when not more than 500,000, moldability and processability are good.

With regard to the proportions of the polymer block (A) and the polymer block (B) in the (A)/(B) block copolymer, though depending on the number-average molecular weight of the (A)/(B) block copolymer, the number-average molecular weights of the polymer block (A) and the polymer block (B), and the like, generally based on the mass of the (A)/(B) block copolymer, it is preferable that the polymer block (A) is 5 to 80% by mass and the polymer block (B) is 20 to 95% by mass; it is more preferable that the polymer block (A) is 10 to 75% by mass and the polymer block (B) is 25 to 90% by mass; and it is still more preferable that the polymer block (A) is 20 to 40% by mass and the polymer block (B) is 60 to 80% by mass. In the (A)/(B) block copolymer, when the proportion of the polymer block (A) is not less than 5% by mass (that is, when the proportion of the polymer block (B) is not more than 95% by mass), the mechanical property of the polymer composition comprising the (A)/(B) block copolymer and molded articles and the like obtained therefrom are good; on the other hand, when the proportion of the polymer block (A) is not more than 80% by mass (that is, when the proportion of the polymer block (B) is not less than 20% by mass), the melt viscosity does not become too high and moldability and processability are good.

The (A)/(B) block copolymer may be either linear or branched into two or more branches, and suffices if having at least one polymer block (A) and at least one polymer block (B) in its molecule, wherein so far as it goes, its structure is not especially limited. A tri-block structure of A-B-A type is especially preferable from the viewpoint of the balance between the mechanical property, heat resistance and processability.

Specific examples thereof include styrene-butadiene-styrene block copolymers, styrene-isoprene-styrene block copolymers, and styrene-butadiene/isoprene-styrene block copolymers. Here, for example, the styrene-butadiene-styrene block copolymer means a block copolymer in a form of a polystyrene block-polybutadiene block-polystyrene block.

A production method of the (A)/(B) block copolymer is not especially limited, but the (A)/(B) block copolymer can be produced, for example, by using a suitable polymerization initiator system and polymerizing successively a vinyl aromatic compound such as styrene and a conjugated diene compound such as butadiene in an inert solvent. Examples of the polymerization initiator system in this case include mixtures of a Lewis acid and an organic compound to form a cationic polymerization active species by the Lewis acid. The Lewis acid includes titanium tetrachloride, tin tetrachloride, boron trichloride and aluminum chloride; and the organic compound includes organic compounds having functional groups such as an alkoxy group, an acyloxy group or a halogen, for example, bis(2-methoxy-2-propyl)benzene, bis(2-acetoxy-2-propyl)benzene and bis(2-chloro-2-propyl) benzene. Together with the above Lewis acid and organic compound, as required, for example, an amide such as N,N-dimethylacetoamide or an ester such as ethyl acetate may further be added as a third component. As the inert solvent for polymerization, there can be used hexane, cyclohexane, methylcyclohexane, methyl chloride, methylene chloride or the like.

A linear (A)/(B) block copolymer can be produced, for example, by (1) a method in which by using, as a polymerization initiator system, a Lewis acid and a compound having one functional group to form a cationic polymerization active species, after a vinyl aromatic compound is polymerized to thereby form a polymer block (A), a conjugated diene compound is added to and polymerized in the reaction system to thereby form a polymer block (B), and as required, the vinyl aromatic compound is further added and polymerized to thereby form a polymer block (A), or (2) a method in which by using, as a polymerization initiator system, a Lewis acid and a compound having two functional groups to form a cationic polymerization active species, after a conjugated diene compound is first polymerized to thereby form a polymer block (B), a vinyl aromatic compound is added to and polymerized in the reaction system to thereby form polymer blocks (A).

Then, a branched (A)/(B) block copolymer can be produced, for example, by a method in which by using, as a polymerization initiator system, a Lewis acid and a compound having three or more functional groups to form a cationic polymerization active species, after a conjugated diene compound is first polymerized to thereby form a polymer block (B), a vinyl aromatic compound is added and polymerized to thereby form polymer blocks (A).

As the (a) component in the polymer composition of the present invention, a hydrogenated product of the above (A)/(B) block copolymer can also be used. The case of using the hydrogenated product is preferable from the viewpoint of improvement of heat resistance and weather resistance due to a decrease by hydrogenation in aliphatic double bonds in the (A)/(B) block copolymer.

In the present invention, as the hydrogenated product of the (A)/(B) block copolymer used as the (a) component, suitable is one in which 90% to 100% of aliphatic double bonds of the (A)/(B) block copolymer is hydrogenated and 10% or less of aromatic double bonds thereof is hydrogenated; and especially preferable is one in which 99% to 100% of aliphatic double bonds of the (A)/(B) block copolymer is hydrogenated and 5% or less of aromatic double bonds thereof is hydrogenated. In such a hydrogenated product of the (A)/(B) block copolymer, a polymer block (B) in which aliphatic double bonds are hydrogenated is substantially a block having a polyolefin structure.

For hydrogenation of the (A)/(B) block copolymer, a well-known method can be adopted. A hydrogenation catalyst includes nickel, porous diatomaceous earth, Raney nickel, copper bichromate, molybdenum sulfide, and carriers such as carbon carrying platinum, palladium or the like.

The hydrogenation can be carried out at an optional pressure (for example, from atmospheric pressure to 300 atm, preferably 5 to 200 atm), at an optional temperature (for example, 20° C. to 350° C.), and for an optional time (for example, 0.2 hour to 10 hours).

The (A)/(B) block copolymer may be one concurrently containing two or more (A)/(B) block copolymers having different properties of molecular weight, styrene content and the like.

Such (A)/(B) block copolymers are commercially available, so these commercially available products can be used. Examples of non-hydrogenated products include "D Series", manufactured by Kraton Corporation, "TR Series", manufactured by JSR Corp., and "Tufprene", "Asaprene", manufactured by Asahi Kasei Corp. Examples of hydrogenated products include "Septon", "Hybrar", manufactured by Kuraray Co., Ltd., "Tuftec", manufactured by Asahi Kasei Corp., "Dynaron", manufactured by JSR Corp., and "G Series", manufactured by Kraton Polymers LLC.

<The (b) Polyolefinic Resin>

The (b) polyolefinic resin according to the present invention is a polymer having olefin as a main component, and is preferably one having an MRF satisfying 0.1 to 500 g/10 min. The (b) polyolefinic resin is not especially limited, and various well-known olefinic polymers can be used. Examples thereof include homopolymers or copolymers of α-olefin having 2 to 20 carbon atoms, such as ethylene, propylene, butene-1, pentene-1, 4-methyl-1-pentene, hexene-1, heptene-1, octene-1, decene-1, undecene-1, dodecene-1, tridecene-1, tetradecene-1, pentadecene-1, hexadecene-1, heptadecene-1, octadecene-1, nonadecene-1 and eicosene-1. Specific examples thereof include compositions containing singly or two or more of olefin polymers such as high-pressure method low-density polyethylene, linear low-density polyethylene (so-called LLDPE), medium-density polyethylene, high-density polyethylene, polypropylene, polypropylene random copolymers, poly-1-butene, poly-4-methyl-1-pentene, low-crystallinity or noncrystallinity ethylene·propylene random copolymers, ethylene·butene-1 random copolymers and propylene·butene-1 random copolymers, ethylene·vinyl acetate copolymers (EVA), ethylene·(meth)acrylic acid copolymers or metal salts thereof, and ethylene-cyclic olefin copolymers.

The (b) polyolefinic resin may contain a non-conjugated diene as a copolymerizable component with the olefin. The non-conjugated diene specifically includes linear non-conjugated dienes such as 1,4-hexadiene, 1,6-octadiene, 2-methyl-1,5-hexadiene, 6-methyl-1,5-heptadiene and 7-methyl-1,6-octadiene, cyclic non-conjugated dienes such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene, and trienes such as 2,3-diisopropylidene-5-norbornene, 2-ethylidene-3-isopropylidene-5-norbornene, 2-propenyl-2,2-norbornadiene, 1,3,7-octatriene and 1,4,9-decatriene. Among these, 1,4-hexadiene and cyclic non-conjugated dienes are preferably used, and dicyclopentadiene and 5-ethylidene-2-norbornene are especially preferably used.

These polyolefinic resins are further allowed to be polymers graft modified with a polar compound such as maleic acid or a silane compound. Among these, polymers or copolymers of α-olefin having 2 to 20, preferably 2 to 10, carbon atoms are desirable.

The intrinsic viscosity [η] as measured in decalin at 135° C. of such (b) polyolefinic resin is not especially limited, but is preferably not less than 0.5 dl/g and not more than 5 dl/g. When the intrinsic viscosity [η] as measured in decalin at 135° C. is too low, the mechanical strength of the polymer composition decreases. When the intrinsic viscosity [η] is too high, the moldability is deteriorated.

Suitable examples of such (b) polyolefinic resin include polyethylene, polypropylene and polybutene; among these, polypropylene-based resins, which are polymers or copolymers having propylene as a main component, are especially preferable from the viewpoint of improvement in heat resistance and mechanical strength of the polymer composition and improvement in solidification speed thereof.

The polypropylene-based resins include propylene homopolymers, and copolymers of propylene and ethylene with at least one monomer selected from α-olefins having 4 to 20 carbon atoms. In the case where the polypropylene-based resin is a copolymer, the copolymer has a structural unit originated from propylene of preferably not less than 90 mol %, more preferably 93 to 99 mol %.

In the present invention, the MFR (melt flow rate) of the (b) polyolefinic resin is a value measured according to JIS K7210, and the value for polyethylene (a polymer or copolymer containing ethylene as a main component) means a value measured under the condition of 190° C. and a load of 2.16 kg; and the value for polyolefin resins other than polyethylene, such as polypropylene, means a value measured under the condition of 230° C. and a load of 2.16 kg.

The (b) polyolefinic resin according to the present invention may be one concurrently containing two or more polyolefinic resins having different kinds and properties such as MFR.

<The (c) Ethylene·α-Olefin Copolymer>

The kinematic viscosity at 100° C. of the ethylene·α-olefin copolymer being the (c) component of the polymer composition according to the present invention is 10 to 5,000 mm$^2$/s, preferably 30 to 3,500 mm$^2$/s, more preferably 500 to 3,000 mm$^2$/s and still more preferably 900 to 2,500 mm$^2$/s. When the kinematic viscosity at 100° C. of the (c) ethylene·α-olefin copolymer is not less than 10 mm$^2$/s and not more than 5,000 mm$^2$/s, remarkably good are the handleability of an obtained resin composition for a masterbatch and the slidability and the wear resistance of an engineering plastic finally obtained.

When the kinematic viscosity at 100° C. of the (c) ethylene·α-olefin copolymer exceeds 5,000 mm$^2$/s, since the compatibility of the (a) (A)/(B) block copolymer or the hydrogenated product thereof with the (c) ethylene·α-olefin copolymer decreases and the dispersibility of the (c) ethylene·α-olefin copolymer decreases, the slidability and the wear resistance of an obtained engineering plastic decrease.

When the kinematic viscosity at 100° C. of the (c) ethylene·α-olefin copolymer is lower than 10 mm$^2$/s, the mechanical property of an obtained engineering plastic decrease.

Since the (c) ethylene·α-olefin copolymer has such a feature that the structure thereof resembles that of the polymer block (B) of the (A)/(B) block copolymer in which aliphatic double bonds are hydrogenated and entanglement of the (c) component with the (a) component is easily caused, thereby enabling addition in a high concentration of the (c) component to a resin composition for a masterbatch, and enabling reduction of the amount of the masterbatch blended in an engineering plastic, the (c) ethylene·α-olefin copolymer can suppress the influence on conventional mechanical property and moldability engineering plastics have.

Further in the (c) ethylene·α-olefin copolymer according to the present invention, the content (hereinafter, referred to also as ethylene content) of a structural unit derived from ethylene is 30 to 85 mol %, preferably 40 to 75 mol % and more preferably 40 to 60 mol %. When the ethylene content is too high or too low, the crystallinity becomes high and the slidability and the wear resistance of an obtained engineering plastic decreases.

The ethylene content of the (c) ethylene·α-olefin copolymer can be measured by a $^{13}$C-NMR method, and identification and determination of the peak can be carried out according to, for example, a method described in "Kobunshi Bunseki Handbook" ((Polymer Analysis Handbook) (in Japanese), published by Asakura Publishing Co., Ltd., pp. 163-170). The content can also be determined by an FT/IR method described later by using an ethylene·α-olefin copolymer whose ethylene content has been quantitatively determined previously.

Examples of the α-olefin constituting the (c) ethylene·α-olefin copolymer include α-olefins having 3 to 20 carbon atoms, such as propylene, butene-1, pentene-1, hexene-1, heptene-1, octene-1, decene-1, undecene-1, dodecene-1, tridecene-1, tetradecene-1, pentadecene-1, hexadecene-1, heptadecene-1, octadecene-1, nonadecene-1 and eicosene-1. The (c) ethylene·α-olefin copolymer may concurrently contain two or more of these α-olefins. Among these α-olefins, from the viewpoint of raising the addition concentration in the resin composition for a masterbatch, α-olefins having 3 to 10 carbon atoms are preferable and propylene is especially preferable.

For producing the (c) ethylene·α-olefin copolymer by polymerizing ethylene with α-olefin, the polymerization can also be advanced in the concurrent presence of at least one other monomer selected from polar group-containing monomers, aromatic vinyl compounds and cyclic olefins in the reaction system. The other monomers can be used in an amount of, for example, 20 parts by mass or less, preferably 10 parts by mass or less, with respect to 100 parts by mass of the total of ethylene and the α-olefins having 3 to 20 carbon atoms.

Examples of the polar group-containing monomers include α,β-unsaturated carboxylic acids such as acrylic acid, methacrylic acid, fumaric acid and maleic anhydride, and metal salts thereof, such as sodium salts thereof, α,β-unsaturated carboxylate esters such as methyl acrylate, ethyl acrylate, n-propyl acrylate, methyl methacrylate and ethyl methacrylate, vinyl esters such as vinyl acetate and vinyl propionate, and unsaturated glycidyls such as glycidyl acrylate and glycidyl methacrylate.

Examples of the aromatic vinyl compounds include styrene, o-methylstyrene, m-methylstyrene, p-methylstyrene, o,p-dimethylstyrene, methoxystyrene, vinylbenzoic acid, methyl vinylbenzoate, vinylbenzyl acetate, hydroxystyrene, p-chlorostyrene, divinylbenzene, α-methylstyrene and allylbenzene.

Examples of the cyclic olefins include ones having 3 to 30, preferably 3 to 20, carbon atoms, such as cyclopentene, cyclohepten, norbornene, 5-methyl-2-norbornene and tetracyclododecene.

The molecular weight distribution of the (c) ethylene·α-olefin copolymer is measured by a method described later using gel permeation chromatography (GPC), and calculated as a ratio (Mw/Mn) of a weight-average molecular weight (Mw) to a number-average molecular weight (Mn) obtained with reference to standard polystyrene. The molecular weight distribution (Mw/Mn) of the (c) ethylene·α-olefin copolymer is not more than 2.5, preferably not more than 2.3 and more preferably not more than 2.0. When the molecular weight distribution (Mw/Mn) excessively exceeds 2.5, there are caused decreases in the mechanical property of molded articles due to evaporation of low-molecular weight components in use in a high-temperature environment, and/or poor appearance of surfaces of the molded articles. It is preferable that the molecular weight distribution (Mw/Mn) of the (c) ethylene·α-olefin copolymer is at least not less than 1.4. When the molecular weight distribution is in this range, the dispersion of the (c) ethylene·α-olefin copolymer in the resin composition for a masterbatch is excellent.

A production method of the (c) ethylene·α-olefin copolymer is not especially limited, but includes methods using a vanadium-based catalyst composed of a vanadium compound and an organoaluminum compound, as described in Japanese Patent Publication No. 2-1163 and Japanese Patent Publication No. 2-7998. Further as a method for producing the copolymer in a high polymerization activity, there may be used a method using a catalytic system composed of a metallocene compound such as zirconocene and an organoaluminum oxy compound (aluminoxane), as described in Japanese Patent Laid-Open No. 61-221207, Japanese Patent Publication No. 7-121969, Japanese Patent No. 279376, Domestic Re-Publication of PCT International Application Publication No. 2015-147215 and the like.

The polymerization reaction can be carried out by any method of a batch system, a semi-continuous system and a continuous system. Further the reaction may also be carried out continuously in two or more polymerizers having different reaction conditions.

The molecular weight of the copolymer to be obtained can be regulated by varying the hydrogen concentration and the polymerization temperature in a polymerization system. In the case of adding hydrogen, it is suitable that the amount thereof is about 0.001 to 5,000 NL per 1 kg of the copolymer to be formed.

The kinematic viscosity at 100° C. of the (c) ethylene·α-olefin copolymer depends on the molecular weight of the polymer. That is, since a high molecular weight gives a high viscosity and a low molecular weight gives a low viscosity, the kinematic viscosity at 100° C. is regulated by regulating the molecular weight. The molecular weight distribution (Mw/Mn) of the polymer to be obtained can be regulated by removing low-molecular weight components in an obtained polymer by a conventionally well-known method like vacuum distillation. Hydrogenation may further be carried out on the obtained polymer by a conventionally well-known method. When double bonds of the obtained polymer are decreased by hydrogenation, the oxidative stability and the heat resistance are improved.

The (c) ethylene·α-olefin copolymer may be used singly or in a combination of two or more kinds thereof having different molecular weights or different monomer compositions.

The (c) ethylene·α-olefin copolymer may further be graft modified with functional groups, and may further be secondarily modified. Examples of these modification methods include methods described in Japanese Patent Laid-Open No. 61-126120, Japanese Patent No. 2593264 and the like; and examples of the secondary-modification method include methods described in Japanese Translation of PCT International Application Publication No. 2008-508402 and the like.

The resin composition for a masterbatch of the present invention can be blended with additives such as heat-resistant stabilizers, weather-resistant stabilizers, flame retardants, antistatic agents, nucleating agents, colorants, foaming agents, fillers and reinforcing agents in the range of not impairing the objects of the present invention.

The resin composition for a masterbatch of the present invention is excellent in molding processability. Therefore, the resin composition for a masterbatch of the present invention can be used broadly in various types of applications, and since being in the excellent balance among properties particularly such as wear resistance and impact strength, is suitable for applications requiring these.

<A Masterbatch Pellet>

A pellet according to the present invention is composed of the above-mentioned resin composition for a masterbatch.

The average particle diameter of the pellets according to the present invention is larger than 1 mm and not larger than 6 mm. The average particle diameter is more preferably 2 to 5 mm and still more preferably 2.5 to 3.5 mm. When the average particle diameter of the pellets is larger than 1 mm and not larger than 6 mm, the pellets can be kneaded sufficiently by an extruder or an injection molding machine. The shape of the thermoplastic resin pellet of the present invention is not especially limited, but examples thereof include cylindrical shapes of larger than 1 mm and not larger than 6 mm, preferably 1.5 to 4 mm, in diameter, and 2 to 6 mm, preferably 2.5 to 4 mm in length, and rectangular parallelepiped shapes of 3 to 6 mm in length and width and 1.5 to 3 mm in thickness. The average particle diameter of the pellets can suitably be regulated by, after the resin composition is kneaded by an extruder, regulating the cutting speed in pelletizing.

The average volume, the average length and the average particle diameter of the pellets can be measured and calculated by the following methods.

<The Average Volume of the Pellets>

50 pellets are randomly sampled; the weight and the specific gravity are measured; and then the average volume of the pellets is calculated by dividing the weight by the specific gravity (weight/specific gravity). Here, the specific gravity of the pellet can be measured according to JIS K7112.

<The Average Length of the Pellets>

50 pellets are randomly sampled; the length of each pellet was measured with calipers; and then the average value of length of all the pellets can be calculated.

<The Average Particle Diameter of the Pellets>

50 pellets are randomly sampled; the maximum diameter (major diameter in the case of ellipse) and the minimum diameter (minor diameter in the case of ellipse) of each pellet are measured with calipers; and then the average value of particle diameter of all the pellets is calculated, assuming that the particle diameter of the pellet is the average value of the maximum diameter and the minimum diameter.

<Molded Articles>

Molded articles of the present invention can be obtained by various types of molding methods involving blending 100 parts by mass of an engineering plastic with 0.5 to 10 parts by mass of the above-mentioned resin composition for a masterbatch.

When the content of the resin composition for a masterbatch is less than 0.5 part by mass with respect to 100 parts by mass of the engineering plastic, sufficient slidability and wear resistance cannot be given to molded articles. When the content exceeds 10 parts by mass, the mechanical property of molded articles is deteriorated. The content of the resin composition for a masterbatch is, with respect to 100 parts by mass of the engineering plastic, preferably 0.8 to 8 parts by mass, more preferably 1 to 7 parts by mass and still more preferably 2 to 6 parts by mass.

A molding method, depending on whether the engineering plastic is a thermoplastic resin or a thermosetting resin, can be selected from molding methods broadly used for thermoplastic resins and thermosetting resins, such as extrusion methods, injection molding methods, vacuum molding methods, blow molding methods, compression molding methods, transfer molding methods, RIM methods and cast molding methods. Further in the case where the above resin is a thermosetting resin, the resin composition for a masterbatch of the present invention may contain a curing agent, or the resin composition may be mixed in the engineering plastic without containing the curing agent, and thereafter, the curing agent may be added and mixed in molding. The molded articles of the present invention can be made as ones of container shapes, tray shapes, sheet shapes, rod shapes, film shapes, fiber shapes, or covering materials for various types of molded articles, or the like, by the various types of molding methods.

The molded articles of the present invention are excellent in slidability, wear resistance and the like.

Examples of applications of the molded articles of the present invention include applications to gears, rotating shafts, bearings and the like, and fiber applications to belts, cloth and the like, but the molded articles are allowed to be used also in applications not requiring the above properties.

Examples of molded articles containing the resin composition for a masterbatch of the present invention as a part thereof or the whole thereof include exterior parts of automobiles, such as radiator grills, rear spoilers, wheel covers, wheel caps, cowl vent grills, air outlet louvers, air scoops, hood bulges, fenders and back doors; engine room interior parts of automobiles, such as cylinder head covers, engine mounts, air intake manifolds, throttle bodies, air intake pipes, radiator tanks, radiator supports, water pump inlets, water pump outlets, thermostat housings, cooling fans, fan shrouds, oil pans, oil filter housings, oil filler caps, oil level gauges, timing belts, timing belt covers and engine covers; fuel system parts of automobiles, such as fuel caps, fuel filler tubes, automotive fuel tanks, fuel sender modules, fuel cutoff valves, quick connectors, canisters, fuel delivery pipes and fuel filler necks; drive line system parts of automobiles, such as shift lever housings and propeller shafts; chassis parts of automobiles, such as stabilizer bar linkage rods; functional parts of automobiles, such as window regulators, door locks, door handles, outside door mirror stays, accelerator pedals, pedal modules, seal rings, bearings, bearing retainers, gears and actuators; electronics parts of automobiles, such as wire harness connectors, relay blocks, sensor housings, encapsulations, ignition coils and distributor caps; interior parts of automobiles, such as instrument panel covers, air conditioner air outlets, various types of operation panels and housings; fuel system parts of general-purpose apparatuses, such as fuel tanks for the general-purpose apparatuses (brush cutters, lawn mowers, chain saws and the like); and electric and electronic parts such as connectors and LED reflectors, electric and electronic parts, building material parts, various types of housings, and exterior parts.

Further, beltlike molded articles include woven belts for seat belt devices used for vehicles and the like, sling belts for heavy loads of building materials and the like, safety belts and harnesses, and general-purpose belts used for transportation.

The molded articles can suitably be used also as coating agents for molded articles requiring the above-mentioned slidability and wear resistance.

The above-mentioned engineering plastic includes thermoplastic resins such as polyacetal resins, ABS resins, polyamide resins, polyphenylene oxide resins, polyimide resins, thermoplastic polyester resins and polycarbonate resins, and thermosetting resins such as epoxy resins, thermosetting unsaturated polyester resins and phenol resins. These resins, as described in publications, for example, "Engineering Plastic", (edited by Hiroshi Maki and Rikio Kobayashi, published by Sangyo Tosho Publishing Co., Ltd.) and "FPR Sekkei Binran (FPR Design Handbook) (in Japanese)" are well-known resins by themselves, and have clear definitions. Hereinafter, a preferable form of each resin will be described.

(1) Polyacetal Resins

Polyacetal resins are typically resins made by ring-openingly polymerizing formalin or trioxane, as required, together with ethylene oxide, in the presence of a cationic catalyst, and resins having a polyoxymethylene chain as the main skeleton, but in the present invention, are preferably ones of copolymer type. Such polyacetal resins are commercially available and examples thereof include Yupital by trade name (Mitsubishi-Engineering Plastics Corp.), which can preferably be used in the present invention.

(2) ABS Resins

ABS resins are typically impact-resistant resins made by graft polymerizing polybutadiene with acrylonitrile and styrene, but in the present invention, are preferably ones having 5 to 40% by weight of the polybutadiene component and having the styrene component and the acrylonitrile component in a weight ratio (styrene/acrylonitrile) of 70/30 to 80/20. Such ABS resins are commercially available and examples thereof include Stylac by trade name (Asahi Kasei Corp.) and Cycolac by trade name (Ube Cycon Ltd.), which can preferably be used in the present invention.

(3) Polyamide Resins

Polyamide resins are typically resins made by polycondensation of a diamine with a dicarboxylic acid, or ring-opening polymerization of a caprolactam, or the like, but in the present invention, are preferably polycondensation reaction products of an aliphatic diamine with an aliphatic or aromatic dicarboxylic acid. Such polyamide reins are commercially available and examples thereof include Leona by trade name (Asahi Kasei Corp.) and Zytel by trade name (DuPont Japan Ltd.), which can preferably be used in the present invention.

(4) Thermoplastic Polyester Resins

Thermoplastic polyester resins are typically resins made by polycondensing a dicarboxylic acid with a diol, but in the present invention, polyethylene terephthalate, polybutylene terephthalate, polyethylene 2,6-naphthalenecarboxylate, polycyclohexane terephthalate and the like are preferably used. Such thermoplastic polyester resins are commercially available and examples thereof include Unitika Polyester Resin by trade name (Unitika Ltd.) and Rynite by trade name (DuPont Japan Ltd.), which can preferably be used in the present invention.

(5) Polyphenylene Oxide Resins

Polyphenylene oxide resins are typically resins made by oxidatively coupling 2,6-dimethylphenol in the presence of a copper catalyst, but modified polyphenylene oxide resins modified by means of blending other resins in the resins, or the like can also be used in the present invention. In the present invention, preferable are polyphenylene oxide resins modified by blend of styrenic polymers. Such polyphenylene oxide resins are commercially available and examples thereof include Xyron by trade name (Asahi Kasei Corp.) and Yupiace by trade name (Mitsubishi-Engineering Plastics Corp.), which can preferably be used in the present invention.

(6) Polyimide Resins

Polyimide resins are typically resins made by polycondensing a tetracarboxylic acid with a diamine to form imide bonds in the main skeleton, but preferable are ones formed from pyromellitic anhydride and diaminodiphenyl ether. Such polyimide resins are commercially available and examples thereof include Vespel by trade name (DuPont Japan Ltd.), which can preferably be used in the present invention.

(7) Polycarbonate Resins

Polycarbonate resins are typically resins made by reacting an aromatic diol (for example, bisphenol A) with phosgene, but in the present invention, diethylene glycol diallyl carbonate is preferable. Such polycarbonate resins are commercially available and examples thereof include Novarex by trade name (Mitsubishi Chemical Corp.), Panlite by trade name (Teijin Chemicals Ltd.) and Lexan by trade name (Nippon GE Plastic Co., Ltd.), which can preferably be used in the present invention.

The above resins (1) to (7) are thermoplastic resins. Resins (8) to (10) described below are thermosetting resins, and the resins in the state before being heat cured will be described.

(8) Epoxy Resins

Epoxy resins are typically resins made by reacting an aromatic diol (for example, bisphenol A) with epichlorohydrin in the presence of alkali, but in the present invention, preferable are bisphenol A epoxy resins, bisphenol F epoxy resins and bisphenol S epoxy resins having an epoxy equivalent of 170 to 5,000. Such epoxy resins are commercially available and examples thereof include Epiclon by trade name (Dainippon Ink and Chemicals, Inc.) and Sumiepoxy by trade name (Sumitomo Chemical Co., Ltd.), which can preferably be used in the present invention.

(9) Thermosetting Unsaturated Polyester Resins

Thermosetting unsaturated polyester resins are typically resins made by esterification reacting an aliphatic unsaturated dicarboxylic acid with an aliphatic diol, but in the present invention, preferable are resins made by esterification reacting an unsaturated dicarboxylic acid such as maleic acid or fumaric acid with a diol such as ethylene glycol or diethylene glycol. Such thermosetting unsaturated polyester resins are commercially available and examples thereof include Rigolac by trade name (Showa Highpolymer Co., Ltd.) and Sumicon by trade name (Sumitomo Bakelite Co., Ltd.), which can preferably be used in the present invention.

(10) Phenol Resins

Phenol resins, in the present invention, include either of so-called novolac type ones and resol type ones, but are preferably novolac type ones to be cured with hexamethylenetetramine, and solid resol type ones having dimethylene ether bonds as the main component. Such phenol resins are commercially available and examples thereof include Sumicon PM by trade name (Sumitomo Bakelite Co., Ltd.) and Nikkaline by trade name (Nippon Synthetic Chemical Industry Co., Ltd.), which can preferably be used in the present invention.

As the engineering plastic, from the viewpoint of homogeneous dispersion of the resin composition for a masterbatch, preferable are thermoplastic resins such as polyacetal resins, ABS resins, polyamide resins, thermoplastic polyester resins, polyimide resins and polycarbonate resins.

EXAMPLES

Hereinafter, the present invention will be described more specifically based on Examples, but the present invention is not limited to these Examples.

[Evaluation Methods]

In the following Examples and Comparative Examples and the like, physical properties and the like of ethylene·α-olefin copolymers were measured by the following methods.

<The Ethylene Content (Mol %)>

The ethylene content (% by mass) in terms of mass was determined by using a Fourier transform infrared spectrometer FT-IR-610 or FT-IR-6100, manufactured by JASCO Corp., calculating the absorbance ratio (D1155 cm$^{-1}$/D721 cm$^{-1}$) of absorption at near 721 cm$^{-1}$ based on the rocking vibration of the long-chain methylene group to absorption at near 1,155 cm$^{-1}$ based on the skeleton vibration thereof, and using a calibration curve previously fabricated (fabricated by using standard samples in ASTM D3900). Then, the ethylene content (mol %) in terms of mol was determined according to the following mathematical expression by using the obtained ethylene content (% by mass).

Ethylene content (mol %)=[(the ethylene content (% by mass)/28)/((the ethylene content (% by mass)/28+a propylene content (% by mass)/42)]×100  [Math. 1]

<The Molecular Weight Distribution (Mw/Mn)>

The molecular weight distribution was measured as follows by using an HLC-8320GPC, manufactured by Tosoh Corp. The separation columns used were TSKgel SuperMultiporeHZ-M (four columns); the column temperature was set at 40° C.; the moving phase used was tetrahydrofuran (Wako Pure Chemical Industries, Ltd.); the development speed was set at 0.35 ml/min; the sample concentration was made to be 5.5 g/L; the sample injection amount was made to be 20 µl; and the detector used was a differential refractometer. The standard polystyrenes used were ones (PStQuick MP-M) manufactured by Tosoh Corp. The weight-average molecular weight (Mw) and the number-average molecular weight (Mn) with reference to polystyrene molecular weight were calculated according to the general calibration procedure, and the molecular weight distribution (Mw/Mn) was calculated from these values.

<The Viscosity Property>

The kinematic viscosity at 100° C. was measured and calculated by the method described in JIS K2283.

<The Unsaturated Bond Amount>

A $^1$H-NMR spectrum (400 MHz, ECX400P, JEOL Ltd.) was measured by using o-dichlorobenzene-d4 as the measurement solvent under the measurement conditions of a measurement temperature of 120° C., a spectrum width of 20 ppm, a pulse repeating time of 7.0 s, and a pulse width of 6.15 µs (45° pulse). For the chemical shift reference, a solvent peak (orthodichlorobenzene 7.1 ppm) was used, and the unsaturated bond amount (number of bonds/1,000 C) per 1,000 carbon atoms was calculated by a ratio of integrated values of a main peak observed at 0 to 3 ppm, and peaks originated from vinyl, vinylidene, disubstituted olefin and trisubstituted olefin observed at 4 to 6 ppm.

<Cutting>

Melt strands after melt mixing by an extruder were evaluated for cutting; and the case where cutting by a pelletizer for the extruder was possible was evaluated as "acceptable", and the case of being impossible was evaluated as "inacceptable".

<Tackiness>

The case where in visual and tactile evaluations of obtained pellets, deposition of oily substances was observed was evaluated as tackiness being "present", and the case where no deposition of oily substances was observed was evaluated as tackiness being "absent".

<The Appearance after Heat Aging>

An obtained molded article was heated in the air in an oven, for a polyamide resin molded article, at 120° C., and for a thermoplastic polyester resin molded article, at 100° C., and held at the temperatures for 168 hours; and thereafter, the appearance thereof was evaluated. The representation of results was as follows.

AA: no change in surface appearance

BB: deposition of oily substances on the molded article surface

<The Impact Strength>

Charpy impact strength was measured according to ISO-179 by using a notched multipurpose test piece.

<The Friction Coefficient and the Specific Wear Loss>

The friction coefficient and the specific wear loss were measured according to JIS K7218 "Sliding Wear Test of Plastic, A-Method" by using a Matsubara-type frictional wear tester. The test conditions were: a mating material was S45C; the speed was 50 cm/s; the distance was 3 km; the load was 15 kg (for the friction coefficient) or 2.5 kg (for the specific wear loss); and the measurement environment temperatures were 23° C. and 150° C. In the case where a test piece is penetrated by the wearing, the specific wear loss was represented to be >10,000×10$^{-3}$ mm$^3$/kgf·km.

<The Limit PV Value>

The limit PV value was evaluated by the stepwise method [JIS K7218 (SUS ring/resin sheet)]. Specifically, the limit PV value was calculated from test loads and a sliding velocity until there occurred a rise in the friction coefficient and a rise in the temperature by heat generation due to fusion and deformation by wearing of a resin caused by the test loads under test conditions of a sliding velocity of 0.2 m/s, the test loads of 0.25 to 25 MPa (at step intervals of 0.25 MPa) and a test temperature of 23° C.

[(a) a Block Copolymer or a Hydrogenated Product Thereof, the Block Copolymer Containing a Polymer Block Having a Vinyl Aromatic Compound as a Main Component and a Polymer Block Having a Conjugated Diene Compound as a Main Component]

SEBS: a polystyrene-poly(ethylene/butylene)-polystyrene block copolymer, Septon™ 8007L (styrene content: 30% by mass, MFR 230° C.: 2 g/10 min, Mw of the copolymer: 90,000), manufactured by Kuraray Co., Ltd.

[(b) a Polyolefinic Resin]

PP: Prime Polypro™ F107 (MFR 230° C.: 7 g/10 min), manufactured by Prime Polymer Co., Ltd.

[Production of (c) an Ethylene-α-Olefin Copolymer]

(c) An ethylene-α-olefin copolymer was produced by the following method.

Synthesis of a Metallocene Compound

Synthesis Example 1

Synthesis of [methylphenylmethylene($\eta^5$-cyclopentadienyl) ($\eta^5$-2,7-di-t-butylfluorenyl)]zirconium dichloride (i) Synthesis of 6-methyl-6-phenylfulvene 7.3 g (101.6 mmol) of lithium cyclopentadiene and 100 ml of dehydrated tetrahydrofuran were added to a 200-mL three-necked flask in a nitrogen atmosphere, and stirred. An obtained solution was cooled in an ice bath, and 15.0 g (111.8 mmol) of acetophenone was added dropwise. Thereafter, the resultant was stirred at room temperature for 20 hours, and an obtained solution was quenched with a diluted hydrochloric acid. 10 mL of hexane was added to the solution to extract a soluble content, and an organic layer was washed with water and saturated brine, and thereafter dried with anhydrous magnesium sulfate. Thereafter, the solvent was removed, and an obtained viscous liquid was separated by column chromatography (hexane) to thereby obtain 6-methyl-6-phenylfurvene (red viscous liquid) being a target substance.

(ii) Synthesis of methyl(cyclopentadienyl) (2,7-di-t-butylfluorenyl) (phenyl)methane 2.01 g (7.20 mmol) of 2,7-di-t-butylfluorene and 50 mL of dehydrated t-butyl methyl ether were added to a 100-mL three-necked flask in a nitrogen atmosphere. 4.60 mL (7.59 mmol) of an n-butyllithium/hexane solution (1.65M) was gradually added under cooling in an ice bath, and stirred at room temperature for 16 hours. 1.66 g (9.85 mmol) of 6-methyl-6-phenylfurvene was added, and thereafter stirred under heated reflux for 1 hour. 50 mL of water was gradually added under cooling in an ice bath, and an obtained two-layer solution was transferred to a 200-mL separatory funnel. 50 mL of diethyl ether was added and the resultant was shaken several times, and thereafter, a water layer was removed. An organic layer was washed three times with 50 mL of water and one time with 50 mL of saturated brine. The organic layer was dried with anhydrous magnesium sulfate for 30 min, and thereafter, the solvent was distilled off under reduced pressure. When a solution obtained by adding a small amount of hexane to the resultant was ultrasonicated, a solid was deposited, which was then collected and washed with a small amount of hexane. The resultant solid was dried under reduced pressure to thereby obtain 2.83 g of methyl (cyclopentadienyl) (2,7-di-t-butylfluorenyl) (phenyl)methane as a white solid.

(iii) Synthesis of [methylphenylmethylene($\eta^5$-cyclopentadienyl) ($\eta^5$-2,7-di-t-butylfluorenyl)]zirconium Dichloride 1.50 g (3.36 mmol) of methyl(cyclopentadienyl) (2,7-di-t-butylfluorenyl) (phenyl)methane, 50 mL of dehydrated toluene and 570 μL (7.03 mmol) of THF were added sequentially to a 100-mL Schlenk flask in a nitrogen atmosphere. 4.20 mL (6.93 mmol) of an n-butyllithium/hexane solution (1.65 M) was added gradually under cooling in an ice bath, and stirred at 45° C. for 5 hours. The solvent was distilled off under reduced pressure, and 40 mL of dehydrated diethyl ether was added to make a red solution. 728 mg (3.12 mmol) of zirconium tetrachloride was added under cooling in a methanol/dry ice bath, and the resultant was stirred for 16 hours while being gradually heated to room temperature to thereby obtain a red orange slurry. A solid obtained by distilling off the solvent under reduced pressure was taken in a glove box, washed with hexane and thereafter extracted with dichloromethane. The extract was concentrated by distilling off the solvent under reduced pressure, and a small amount of hexane was added to the concentrate, and was allowed to stand at −20° C. to thereby deposit a red orange solid. The solid was washed with a small amount of hexane and dried under reduced pressure to thereby obtain 1.20 g of [methylphenylmethylene($\eta^5$-cyclopentadienyl) ($\eta^5$-2,7-di-t-butylfluorenyl)]zirconium dichloride as a red orange solid.

Polymerization Example 1

710 mL of heptane and 145 g of propylene were charged in a nitrogen-thoroughly replaced 2 L-volume stainless steel autoclave. The temperature in the system was raised to 150° C., and hydrogen at 0.40 MPa and ethylene at 0.27 MPa were supplied to make a total pressure of 3 MPaG. Then, 0.4 mmol of triisobutylaluminum, 0.0001 mmol of [methylphenylmethylene($\eta^5$-cyclopentadienyl) ($\eta^5$-2,7-di-t-butylfluorenyl)]zirconium dichloride and 0.001 mmol of N,N-dimethylanilinium tetrakis(pentafluorophenyl)borate were introduced with nitrogen under pressure, and stirred at a stirring rotating speed of 400 rpm to thereby initiate polymerization. Thereafter, the polymerization was carried out at 150° C. for 5 min while the total pressure was kept at 3 MPaG by continuously supplying ethylene alone. The polymerization was terminated by addition of a small amount of ethanol to the system, and thereafter, unreacted ethylene, propylene and hydrogen were purged. An obtained polymer solution was washed three times with 1,000 mL of a 0.2 mol/L hydrochloric acid and three times with 1,000 mL of distilled water, and was dried with magnesium sulfate, and the solvent was distilled off under reduced pressure.

Further, 100 mL of a hexane solution of a 0.5% by mass Pd/alumina catalyst and the polymer which had been dissolved in 500 mL of hexane were added to a 1 L-volume stainless steel autoclave, which was then tightly closed and replaced with nitrogen. Then, the resultant was heated to 140° C. under stirring; the system interior was replaced with hydrogen and the pressure therein was raised to 1.5 MPa with hydrogen to carry out hydrogenation reaction for 15 min.

The solvent of an obtained polymer solution was distilled off under reduced pressure, and thereafter dried overnight under reduced pressure at 80° C. to thereby obtain 52.2 g of an ethylene-propylene copolymer (Polymer 1). The content of the structural unit originated from ethylene of Polymer 1 was 53.1 mol %; the molecular weight distribution (Mw/Mn) was 1.8; and the kinematic viscosity at 100° C. was 605 mm$^2$/s. Further the unsaturated bond amount of Polymer 1 was lower than 0.1 bond/1,000 C.

[Engineering Plastics]
PA: a polyamide resin, PA6, Amilan CM1007, manufactured by Toray Industries, Inc.
PET: a thermoplastic polyester resin, polyethylene terephthalate, Unitika Polyester Resin SA-1206, manufactured by Unitika Ltd.
[Mineral Oil]
A paraffin-based process oil (Diana Process Oil PW-380, manufactured by Idemitsu Kosan Co., Ltd., 100° C. kinematic viscosity: 30 mm$^2$/s)

Example 1 to Example 3, Comparative Example 1 to Comparative Example 4

In each of Example 1 to Example 3, and Comparative Example 1 to Comparative Example 4, SEBS and PP were previously blended in mass ratios indicated in Table 1, and melt mixed by a 15-mmØ twin-screw extruder (L/D=45) under the cylinder temperature condition of 230 to 250° C. In the melt mixing time, Polymer 1 heated at 100° C. was quantitatively fed from a vent port of the extruder by using a plunger-type metering pump so that Polymer 1 had a mass ratio indicated in Table 1, to thereby fabricate a resin composition for a masterbatch. There are shown in Table 1, evaluation of masterbatch moldability by evaluation of cutting of masterbatch pellets composed of the resin composition for a masterbatch, and evaluation of tackiness of the obtained pellets.
In Table 1, numerical values indicated for SEBS, PP and Polymer 1 indicate parts by mass.

of Polymer 1 added was up to 5 parts by mass with respect to 100 parts by mass of the PET, when the amount exceeded 5 parts by mass, the amount of melt strands discharged became unstable and no pellets could be obtained. Pellets obtained in the case where the amount of Polymer 1 added was made to be 5 parts by mass with respect to 100 parts by mass of the PET were named MB-R2.

Example 4, Example 5

Pellets were fabricated by previously blending the masterbatch pellets (MB) obtained in Example 2 and PA in mass ratios indicated in Table 2, and melt mixing the resultant by using the above-mentioned extruder under the condition of a cylinder temperature of 240° C. Molded pieces were fabricated from the respective obtained pellets by injection molding, and the obtained molded pieces were evaluated for appearance (appearance after heat aging), mechanical property (impact strength), slidability (friction coefficient) and wear resistance (specific wear loss, limit PV value). Results are shown in Table 2.

Example 6, Example 7

Pellets were fabricated by previously blending the masterbatch pellets (MB) obtained in Example 2 and PET in mass ratios indicated in Table 2, and melt mixing the resultant by using the above-mentioned extruder under the condition of a cylinder temperature of 280° C. Molded pieces were fabricated from the respective obtained pellets

TABLE 1

|  | Example 1 | Example 2 | Example 3 | Comparative Example 1 | Comparative Example 2 | Comparative Example 3 | Comparative Example 4 |
| --- | --- | --- | --- | --- | --- | --- | --- |
| SEBS | 100 | 100 | 100 | 100 | 100 | 100 | 100 |
| PP | 100 | 67 | 43 | 0 | 25 | 67 | 160 |
| Polymer 1 | 140 | 133 | 143 | 100 | 100 | 200 | 100 |
| Cutting | acceptable | acceptable | acceptable | inacceptable | inacceptable | acceptable | acceptable |
| Tackiness | absent | absent | absent | — | — | present | present |

Reference Example 1

Fabrication of a masterbatch was attempted by melting PP by using the 15-mmØ twin-screw extruder (L/D=45) under the cylinder temperature condition of 280° C., and quantitatively feeding Polymer 1 heated at 100° C. from the vent port of the above extruder by using the plunger-type metering pump; however, although pellets were obtained in the case where the amount of Polymer 1 added was up to 10 parts by mass with respect to 100 parts by mass of the PP, when the amount exceeded 10 parts by mass, the amount of melt strands discharged became unstable and no pellets could be obtained. Pellets obtained in the case where the amount of Polymer 1 added was made to be 10 parts by mass with respect to 100 parts by mass of the PP were named MB-R1.

Reference Example 2

Fabrication of a masterbatch was attempted by melting PET as a base material resin for the masterbatch by using the 15-mmØ twin-screw extruder (L/D=45) under the cylinder temperature condition of 280° C., and quantitatively feeding Polymer 1 heated at 100° C. from the vent port of the above extruder by using the plunger-type metering pump; however, although pellets were obtained in the case where the amount by injection molding, and the obtained molded pieces were evaluated for appearance (appearance after heat aging), mechanical property (impact strength), slidability (friction coefficient) and wear resistance (specific wear loss, limit PV value). Results are shown in Table 2.

Comparative Example 5

Molded pieces were obtained as in Example 4, except for using no masterbatch pellets (MB) obtained in Example 2, and the obtained molded pieces were evaluated for appearance (appearance after heat aging), mechanical property (impact strength), slidability (friction coefficient) and wear resistance (specific wear loss, limit PV value). Results are shown in Table 3.

Comparative Example 6

Molded pieces were obtained as in Example 6, except for using no masterbatch pellets (MB) obtained in Example 2, and the obtained molded pieces were evaluated for appearance (appearance after heat aging), mechanical property (impact strength), slidability (friction coefficient) and wear resistance (specific wear loss, limit PV value). Results are shown in Table 3.

Comparative Example 7

Molded pieces were obtained as in Example 4, except for using 5 parts by mass of MB-R1 in place of 5 parts by mass of the masterbatch pellets (MB) obtained in Example 2, and the obtained molded pieces were evaluated for appearance (appearance after heat aging), mechanical property (impact strength), slidability (friction coefficient) and wear resistance (specific wear loss, limit PV value). Results are shown in Table 3.

Comparative Example 8

Molded pieces were obtained as in Example 6, except for using 6 parts by mass of MB-R2 in place of 6 parts by mass of the masterbatch pellets (MB) obtained in Example 2, and the obtained molded pieces were evaluated for appearance (appearance after heat aging), mechanical property (impact strength), slidability (friction coefficient) and wear resistance (specific wear loss, limit PV value). Results are shown in Table 3.

Comparative Example 9

PA pellets were fabricated by blending Polymer 1 and PA heated at 100° C. in mass ratios indicated in Table 4 by using the plunger-type metering pump, and quantitatively feeding the resultant from the vent port of the above extruder. Molded pieces were fabricated from the obtained pellets by injection molding, and the obtained molded pieces were evaluated for appearance (appearance after heat aging), mechanical property (impact strength), slidability (friction coefficient) and wear resistance (specific wear loss, limit PV value). Results are shown in Table 4.

Comparative Example 10

Molded pieces were obtained as in Comparative Example 9, except for using 2 parts by mass of the mineral oil in place of 2 parts by mass of Polymer 1, and the obtained molded pieces were evaluated for appearance (appearance after heat aging), mechanical property (impact strength), slidability (friction coefficient) and wear resistance (specific wear loss, limit PV value). Results are shown in Table 4.

In Tables 2 to 4, the numerical values indicated for PA, PET, MB, MB-R1, MB-R2, Polymer 1 and the mineral oil indicate parts by mass.

TABLE 2

|  | Example 4 | Example 5 | Example 6 | Example 7 |
|---|---|---|---|---|
| PA | 100 | 100 |  |  |
| PET |  |  | 100 | 100 |
| MB | 5 | 2.5 | 6 | 4 |
| Appearance after Heat aging | AA | AA | AA | AA |
| Impact Strength (MPa) | 8.3 | 7.5 | 5.8 | 4.9 |
| Friction Coefficient | 0.25 | 0.28 | 0.16 | 0.19 |
| Specific Wear loss (×10$^{-3}$ mm$^3$/kgf · km) | 200 | 350 | 100 | 100 |
| Limit PV Value (MPa · m/min) | >30 | >30 | >30 | >30 |

TABLE 3

|  | Comparative Example 5 | Comparative Example 6 | Comparative Example 7 | Comparative Example 8 |
|---|---|---|---|---|
| PA | 100 |  | 100 |  |
| PET |  | 100 |  | 100 |
| MB-R1 |  |  | 5 |  |
| MB-R2 |  |  |  | 6 |
| Appearance after Heat aging | AA | AA | AA | AA |
| Impact Strength (MPa) | 3.5 | 3.1 | 4.1 | 3.0 |
| Friction Coefficient | 0.40 | 0.58 | 0.39 | 0.59 |
| Specific Wear loss (×10$^{-3}$ mm$^3$/kgf · km) | >10,000 | >10,000 | >10,000 | >10,000 |
| Limit PV Value (MPa · m/min) | 10 | 10 | 10 | 10 |

TABLE 4

|  | Comparative Example 9 | Comparative Example 10 |
|---|---|---|
| PA | 100 | 100 |
| PET |  |  |
| Polymer 1 | 2 |  |
| Mineral Oil |  | 2 |
| Appearance after Heat aging | BB | BB |
| Impact Strength (MPa) | 3.5 | 3.5 |
| Friction Coefficient | 0.24 | 0.38 |
| Specific Wear loss (×10$^{-3}$ mm$^3$/kgf · km) | 210 | >10,000 |
| Limit PV Value (MPa · m/min) | >30 | 12 |

As shown in Table 1, in Example 1 to Example 3, which were resin compositions for masterbatches of the present invention, good pellets excellent in handleability were obtained. Here, the cutting speed of the pelletizer was regulated so that the average particle diameter of the pellets became 3 to 4 mm. By contrast, in Comparative Example 1, which contained no (b) polyolefinic resin, and in Comparative Example 2, which had a low content of the (b) polyolefinic resin, cutting failure of melt strands was caused and no pellets could be obtained. Further in Comparative Example 3, which had an excessive content of the (c) ethylene·α-olefin copolymer, and in Comparative Example 4, which had an excessive content of the (b) polyolefinic resin, the (c) ethylene·α-olefin copolymer bled out from the obtained pellets and the handleability of the pellets was difficult.

As shown in Table 2 and Table 3, Example 4 to Example 7, which were engineering plastic molded articles obtained by using the masterbatches obtained by the present invention, had excellent slidability and wear resistance for any of the engineering plastics, as compared to Comparative Example 5 and Comparative Example 6, which contained no resin composition for a masterbatch of the present invention.

Further in Comparative Example 6 and Comparative Example 7, in which the pellets obtained in Reference Example 1 or Reference Example 2 were blended, no sufficient effect of improving the slidability was attained.

Here, it is obvious that excessive blending of MB-R1, whose composition had mostly the olefinic resin, or of MB-R2, which once underwent a heat history by melt mixing, greatly reduces conventional mechanical property engineering plastics have.

As shown in Table 4, in Comparative Example 9 and Comparative Example 10, in which Polymer 1 or the mineral oil, being an oily compound, was added directly to the engineering plastic, the oily compound bled out to the molded piece surface in a high-temperature environment, resulting in bringing about remarkably inferior appearance.

The invention claimed is:

1. A molded article, comprising
   any one resin of polyacetal resins, ABS resins, polyamide resins, thermoplastic polyester resins, polyimide resins and polycarbonate resins, and
   0.5 to 10 parts by mass of a resin composition for a masterbatch with respect to 100 parts by mass of the one resin of polyacetal resins, ABS resins, thermoplastic polyester resins, polyimide resins and polycarbonate resins,
   wherein the resin composition for a masterbatch comprises:
   (a) a block copolymer or a hydrogenated product thereof, the block copolymer containing a polymer block having a structural unit derived from a vinyl aromatic compound as a main component and a polymer block having a structural unit derived from a conjugated diene compound as a main component; and
   40 to 100 parts by mass of (b) a polyolefinic resin; and
   100 to 150 parts by mass of (c) an ethylene·α-olefin copolymer having characteristics (c1) to (c3) described below, with respect to 100 parts by mass of the (a) component,
      (c1) a kinematic viscosity at 100° C. is 10 to 5,000 mm²/s;
      (c2) a content of a structural unit derived from ethylene is in the range of 30 to 85 mol %; and
      (c3) a molecular weight distribution (Mw/Mn) for the molecular weight measured by gel permeation chromatography (GPC) with reference to polystyrene is not more than 2.5.

2. The molded article according to claim 1, wherein the (a) component is a hydrogenated product of the block copolymer.

3. The molded article according to claim 1, wherein the kinematic viscosity of the (c) ethylene·α-olefin copolymer at 100° C. is 500 to 3,000 mm²/s.

4. The molded article according to claim 1, wherein the α-olefin of the (c) ethylene·α-olefin copolymer is propylene.

5. The molded article according to claim 1, wherein the (b) polyolefinic resin is polypropylene.

6. The molded article according to claim 1, wherein the conjugated diene compound is butadiene.

7. A resin composition, comprising:
   any one resin of polyacetal resins, ABS resins, polyamide resins, thermoplastic polyester resins, polyimide resins and polycarbonate resins; and
   0.2 to 3 parts by mass of (a) a block copolymer or a hydrogenated product thereof, the block copolymer containing a polymer block having a structural unit derived from a vinyl aromatic compound as a main component and a polymer block having a structural unit derived from a conjugated diene compound as a main component;
   0.08 to 3 parts by mass of (b) a polyolefinic resin; and
   0.2 to 4.5 parts by mass of (c) an ethylene·α-olefin copolymer having characteristics (c1) to (c3) described below above,
   with respect to 100 parts by mass of the one resin of polyacetal resins, ABS resins, thermoplastic polyester resins, polyimide resins and polycarbonate resins,
      (c1) a kinematic viscosity at 100° C. is 10 to 5,000 mm² s;
      (c2) a content of a structural unit derived from ethylene is in the range of 30 to 85 mol %; and
      (c3) a molecular weight distribution (Mw/Mn) for the molecular weight measured by gel permeation chromatography (GPC) with reference to polystyrene is not more than 2.5:
   wherein a content of the (b) component is 40 to 100 parts by mass and a content of the (c) component is 100 to 150 parts by mass with respect to 100 parts by mass of the (a) component.

8. A molded article comprising the resin composition according to claim 7.

* * * * *